United States Patent [19]
Nilsson

[11] 3,977,558
[45] Aug. 31, 1976

[54] GOODS CONTAINER
[75] Inventor: Alvar Erling Nilsson, Falkenberg, Sweden
[73] Assignee: Pelly AB, Falkenberg, Sweden
[22] Filed: Sept. 19, 1975
[21] Appl. No.: 615,005

[30] Foreign Application Priority Data
Sept. 30, 1974 Sweden .............................. 7412264

[52] U.S. Cl. ................................ 220/1.5; 220/324
[51] Int. Cl.² ...................... B65J 1/02; B65D 45/16
[58] Field of Search ................ 220/324, 1.5, 4 F, 6, 220/7; 292/300, 302

[56] References Cited
UNITED STATES PATENTS
3,810,648  5/1974  Hallenius ........................ 220/1.5 X
3,861,554  1/1975  Legg et al. ...................... 220/1.5 X Primary Examiner—George E. Lowrance
Assistant Examiner—Steven M. Pollard
Attorney, Agent, or Firm—Beveridge, DeGrandi, Kline & Lunsford

[57] ABSTRACT

Goods container with a first side wall for opening and closing of the container which wall is pivotably mounted on a second side wall. A hook-and-clasp locking device connects the first side wall and a third side wall. When engaged by the clasp, the hook is movable from a first position where the clasp is shiftable away from the hook so that the wall can be opened to a second position where the third side wall obstructs shifting of the clasp away from the hook.

2 Claims, 8 Drawing Figures

GOODS CONTAINER

The present invention relates to a goods container with at least one first side wall intended for opening and closing of the goods container and being mounted on or at a second side wall by hinge means provided both for pivoting the first side wall about the edge of the second side wall and for shifting the first side wall along the edge of the second side wall, the first side wall, in the closing position of the goods container, extending between the second side wall and a third side wall, a locking device being arranged between the first side wall and the third side wall.

Many prior art goods containers are provided with a locking device between the first and third side walls for locking of the two walls together primarily during movement of the goods container while carrying a load. However, the locking devices of prior art goods containers are of an extremely complicated construction and comprise a plurality of movable, and sometimes resilient, parts. There are also goods containers with simpler locking devices, but it has proved that the simpler locking devices may very easily be accidentally unlocked during handling of the goods container so that the first side wall pivots open and the goods, or the load in the goods container, may fall out.

The object of the present invention is to provide a goods container with as simple and reliable a locking device as possible.

This is achieved according to the present invention in a goods container of the type indicated by way of introduction, in that the locking device comprises a locking hook in a recess in the edge of the third side wall and a locking clasp on the free edge of the first side wall. The locking clasp is designed to grasp the locking hook and simultaneously permit movement of the locking hook, and the third wall which supports the locking hook, in a direction towards the first and second side walls, to a first position in which the locking clasp is shiftable away from the locking hook so that the first side wall becomes pivotal to open position; and in a direction from the first and second side walls, to a second position in which a portion of the locking clasp engages with a portion in the recess in the event of attempts to shift the locking clasp away from the locking hook.

A further object of the present invention is to design the goods container indicated by way of introduction in as stable a manner as possible.

This is achieved according to the present invention in the goods container indicated by way of introduction in that the hinge means located between the second side wall and the first side wall is in the form of a shaft which extends between the upper and lower sections of the second side wall, and of a tube fitting onto the shaft and fixed at the edge of the first side wall, the edge being bent out of the plane of the first side wall and the length of the tube being less than the length of the shaft in order to permit shifting of the first side wall along the shaft.

The nature of the invention and its objects will be more fully understood from the following description of the drawings and discussion relating thereto and to one embodiment of the present invention.

Figure 1:
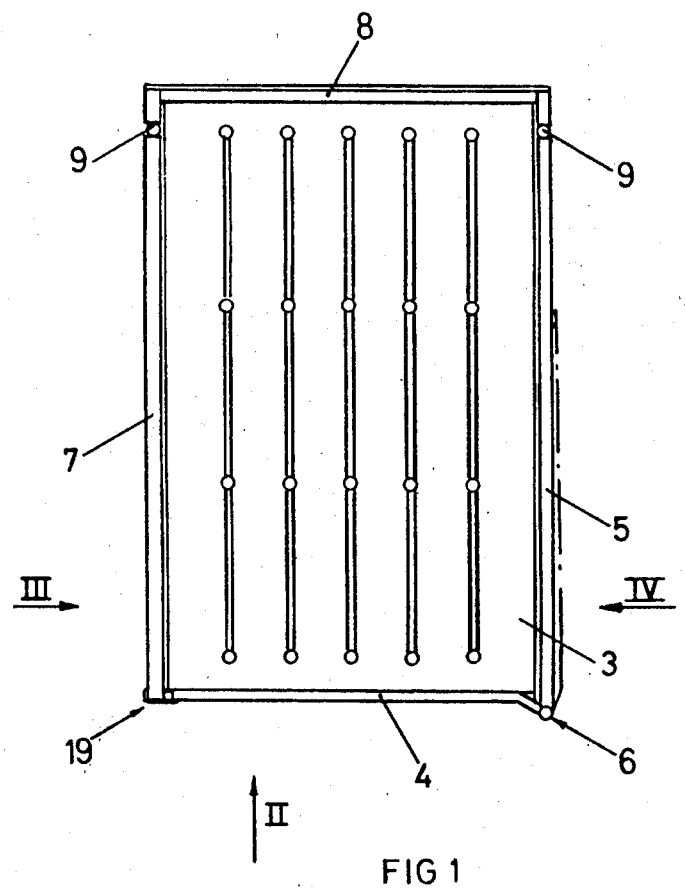
FIG. 1 is a top plan view of the goods container according to the present invention.
Figure 2:
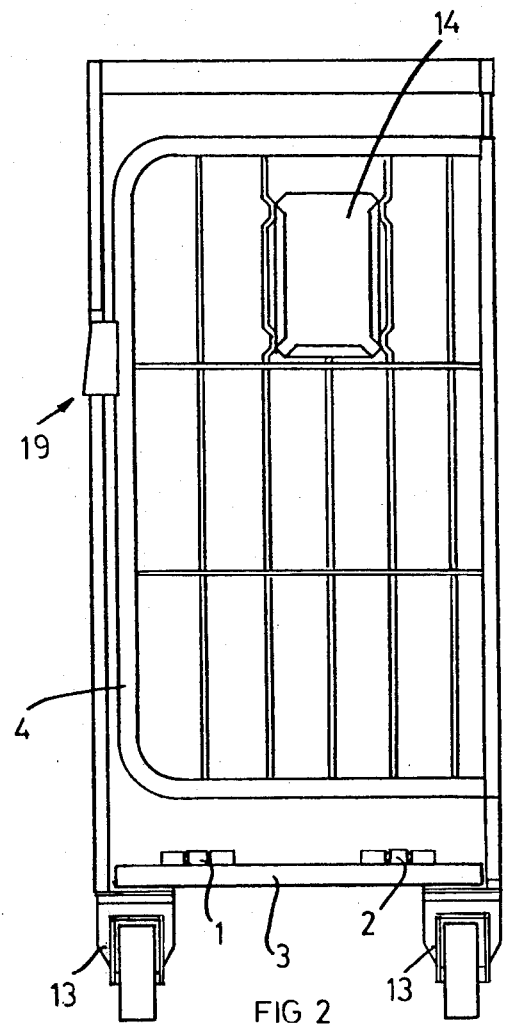
FIG. 2 is a view of the direction of the arrow II in FIG. 1.
Figure 3:
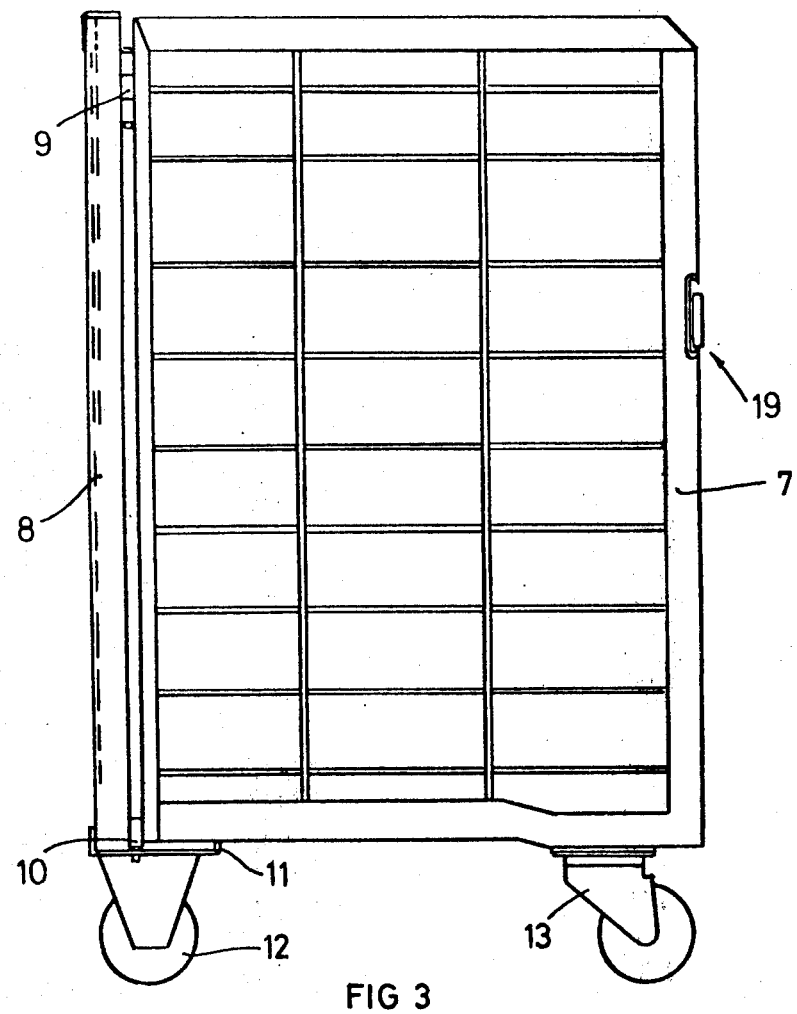
FIG. 3 is a view in the direction of the arrow III in FIG. 1.
Figure 4:
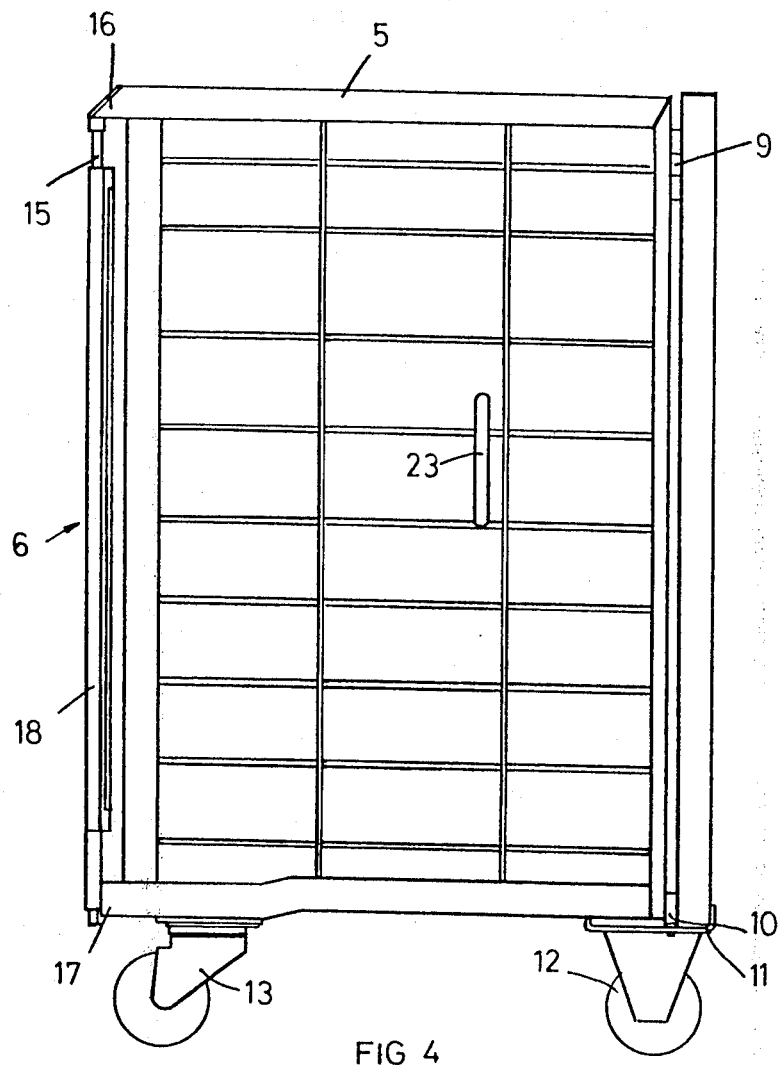
FIG. 4 is a view in the direction of the arrow IV in FIG. 1.

Referring to the drawings, the goods container shown in FIGS. 1–4 has a bottom portion 3 pivotal on hinge means 1 and 2. In the position shown in FIGS. 1–4, the bottom portion 3 is in the operative position and permits loading of the goods container. The goods container has a first side wall 4 which is pivotally mounted on a second side wall 5 by hinge means 6. The goods container also has a third side wall 7 which, in principle, is identical to the second side wall 5. The side walls 5 and 7 are pivotally mounted on a rear or fourth side wall 8 by upper hinge means 9 and lower hinge means 10. A beam 11 is disposed on the underside of the rear wall 8 and supports, at each end, a wheel 12. A pivotal wheel 13 is disposed at the lower corner of the side walls 5 and 9 distal from the beam 11.

Each one of the side walls 4, 5, 7 and 8 included in the goods container are constructed of a frame in the form of preferably square tubes in which a mesh of preferably welded metal wires is fixed in a suitable manner. A holder 14 for a card or the like is also provided in the mesh of the first side wall 4.

As was mentioned earlier, the first side wall 4 is mounted on the second side wall 5 by hinge means 6. This hinge means 6 comprises a shaft 15 which is fixed between an upper projecting portion 16 of the side wall 5 and a lower projecting portion 17 of the side wall 5. Furthermore, the hinge means 6 consists of a tube 18 which fits onto the shaft 15 and is shiftable and pivotal on the shaft 15. As is apparent from FIG. 4 there is a certain amount of play between the upper end of the tube 18 and the upper fixing point of the shaft 15 in the portion 16, this play permitting shifting of the tube 18 upwardly on the shaft 15 until the tube comes into contact with the upper fixing point of the shaft 15. The edge of the side wall 4, on which the tube 18 is fixed, is bent, as is more clearly illustrated in FIG. 1, in order that the side wall 4 may assume the position intimated by dot-dash lines in FIG. 1.

The first side wall 4 is to assume this position when the goods container is to be nested in another, empty, goods container. In order to permit this, the bottom portion 3 is pivoted up towards the rear wall 8 and the side walls 5 and 7 are pivoted outwardly from each other, this being allowed by the different hinge means.

Figure 7:
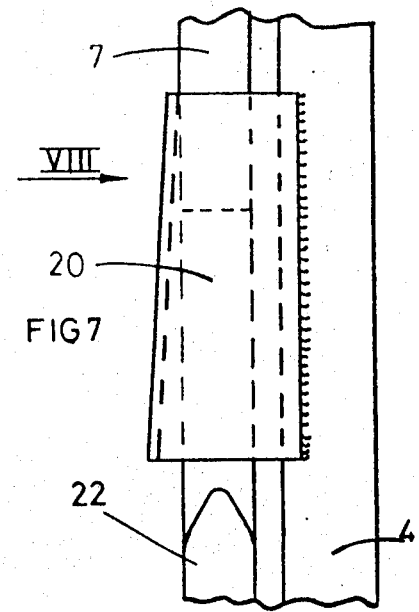
FIG. 7 is a similar view to FIG. 1 but with the locking device in the open position.
Figure 5:
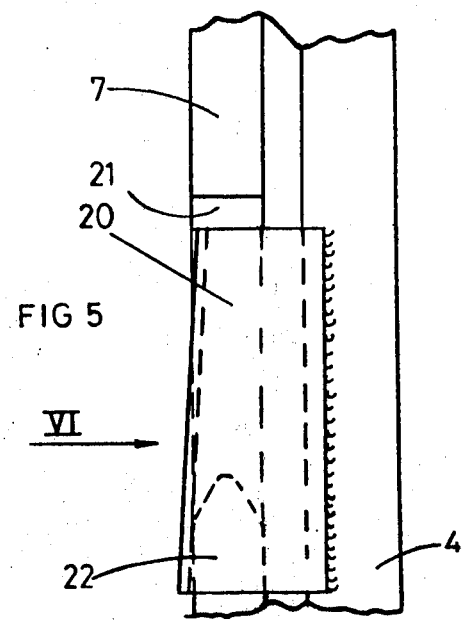
FIG. 5 is a similar view to FIG. 2, on a larger scale, of the locking device according to the invention, in the locking position.
Figure 8:
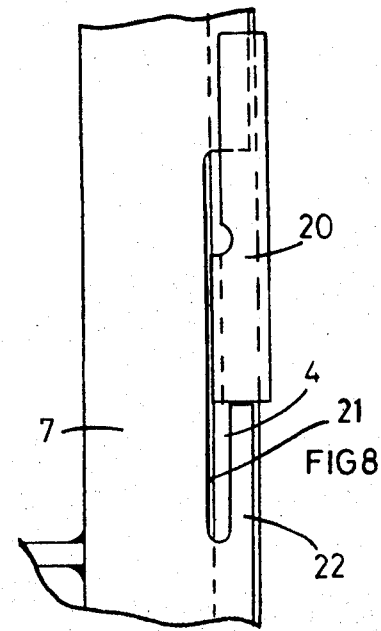
FIG. 8 is a view in the direction of the arrow VIII in FIG. 7.
Figure 6:
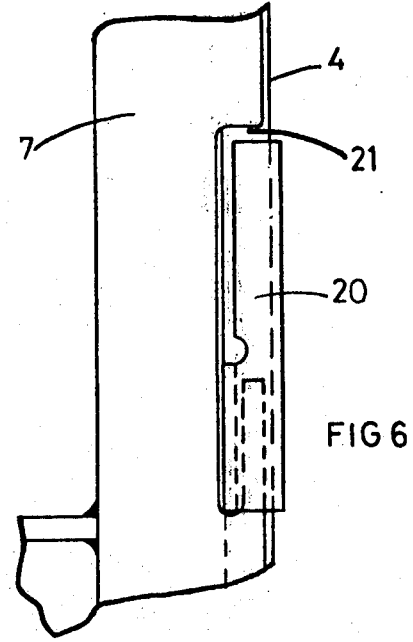
FIG. 6 is a view in the direction of the arrow VI in FIG. 5.

Furthermore, a locking device 19, shown in greater detail in FIGS. 5–8, is provided between the first side wall 4 and the third side wall 7. The locking device 19 consists of a locking clasp 20 fixed, preferably fixedly welded, on the edge of the side wall 4, and of a locking hook 22 disposed in a recess 21 in the third side wall 7. The locking clasp 20 proper is so dimensioned and designed that it can grasp the locking hook 22 while permitting movement of the locking hook and thereby of the third side wall 7 in a direction both towards the first side wall 4 and away from the first side wall 4. The locking clasp 20 fits into the recess 21 which permits the above-mentioned shifting of the side wall 7 and the locking hook 22. When the third side wall 7 is pressed outwardly from the first side wall 4 because of some form of load, and when the locking device is in the position shown in FIG. 5, the upper portion of the recess 21 will project from the upper portion of the locking clasp 20 so that shifting of the locking clasp upwardly is prevented as is opening of the locking device 19. In order to allow opening of the locking device 19, the third side wall 7 must first be pressed towards the first side wall 4 so that the upper portion of the locking clasp 20 will be free from the upper edge of the recess 21, whereupon the locking clasp 20 and the side wall 4 can be shifted to the position shown in FIG. 7, in which position the locking hook 22 will be free and the side wall 4 can be pivoted for opening of the goods container and for placing in the position shown in FIG. 1 alongside the second side wall 5. In this position alongside the second side wall 5 the locking clasp 20 can be brought into engagement with a locking hook 23 which is fixed on the wire mesh in the second side wall 5.

The container according to the present invention may be modified in a number of ways without departing from the spirit and scope of the appended claims and the above description should not, therefore, be considered as limitative of the scope of the invention.

What we claim is:

1. A goods container with at least one first side wall intended for opening and closing of said goods container and being mounted on or at a second side wall by hinge means provided both for pivoting said first side wall about the edge of said second side wall and for shifting said first side wall along the edge of said second side wall, said first side wall, in closing position of said goods container, extending between said second side wall and a third side wall, and a locking device being arranged between said first side wall and said third side wall, wherein said locking device comprises a locking hook in a recess in the edge of said third side wall and a locking clasp on the free edge of said first side wall, wherein the locking clasp is designed to grasp said locking hook and simultaneously permit movement of said locking hook and said third side wall which supports said locking hook, in a direction towards said first and said second side walls, to a first position in which said locking clasp is shiftable away from said locking hook so that said first side wall becomes pivotal to open position; and in a direction from said first and said second side walls, to a second position in which a portion of said locking clasp engages with a portion of said recess in the event of attempts to shift said locking clasp away from said locking hook.

2. A goods container as claimed in claim 1, wherein the hinge means between said second side wall and said first side wall comprises a shaft extending between the upper section and the lower section of said second side wall, and a tube fitting onto said shaft and fixed at the edge of said first side wall, said edge being bent out of the plane of said first side wall, the length of said tube being less than the length of said shaft in order to permit shifting of said first side wall along said shaft.

* * * * *